(12) United States Patent
Krechmery et al.

(10) Patent No.: US 7,028,705 B1
(45) Date of Patent: Apr. 18, 2006

(54) HIGH TORQUE FAILSAFE VALVE OPERATOR

(75) Inventors: Rager Krechmery, La Verne, CA (US); Tarig Latif, Downey, CA (US)

(73) Assignee: Barksdale, Inc., Los Angeles, CA (US)

( * ) Notice: Subject to any disclaimer, the term of this patent is extended or adjusted under 35 U.S.C. 154(b) by 309 days.

(21) Appl. No.: 10/765,409

(22) Filed: Jan. 27, 2004

Related U.S. Application Data

(60) Provisional application No. 60/443,467, filed on Jan. 28, 2003.

(51) Int. Cl.
  *F16K 17/00* (2006.01)
  *F16K 31/04* (2006.01)
  *F16K 31/54* (2006.01)

(52) U.S. Cl. ............ 137/463; 137/625.21; 137/625.65; 251/67; 251/250; 251/129.12; 251/77

(58) Field of Classification Search ................... 251/78, 251/129.03, 129.12, 67, 229, 231, 250, 77; 137/625.21, 463, 625.65
See application file for complete search history.

(56) References Cited

U.S. PATENT DOCUMENTS

| 476,573 | A | * | 6/1892 | Stout ..................... 251/129.09 |
|---|---|---|---|---|
| 558,256 | A | * | 4/1896 | Bush ..................... 251/129.09 |
| 2,318,010 | A | * | 5/1943 | Panish ......................... 74/625 |
| 3,056,573 | A | * | 10/1962 | Matheson et al. ............ 251/31 |
| 3,261,266 | A | * | 7/1966 | Hyman et al. ................ 92/138 |
| 4,225,110 | A | * | 9/1980 | Akkerman et al. ........... 251/58 |
| 4,657,222 | A | * | 4/1987 | Tullio .......................... 251/56 |
| 4,741,365 | A | * | 5/1988 | Van Ornum .......... 137/625.65 |
| 5,310,021 | A | * | 5/1994 | Hightower ................ 185/40 R |

* cited by examiner

*Primary Examiner*—Eric Keasel
*Assistant Examiner*—Craig Schneider
(74) *Attorney, Agent, or Firm*—Leon D. Rosen

(57) ABSTRACT

A fluid valve operator for moving a moveable valve element such as a disc (14) that is pressed forcefully against a surface of a valve frame (12). The valve operator includes first and second electric gear reduction motors (22, 24) that each has a movable driving member such as a rack (34, 36) that moves against a handle (20) of the valve element to move the valve element to a connect or disconnect position. Each motor withdraws its driving member from the valve member handle after moving the valve member. A default mechanism (90) moves the valve element handle to a preselected one of the positions, such as the disconnect position, when pressure of a fluid falls below a preselected level.

10 Claims, 3 Drawing Sheets

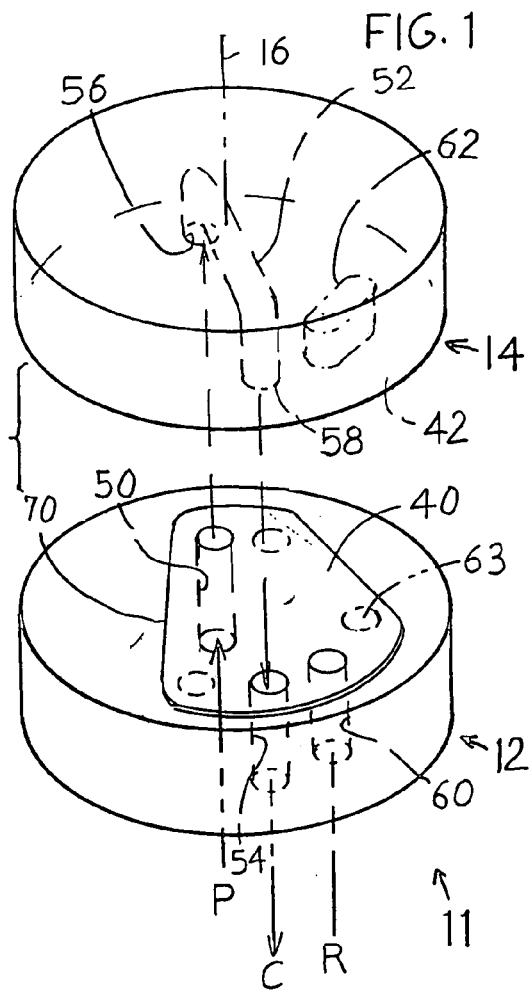
FIG. 1
FIG. 1A
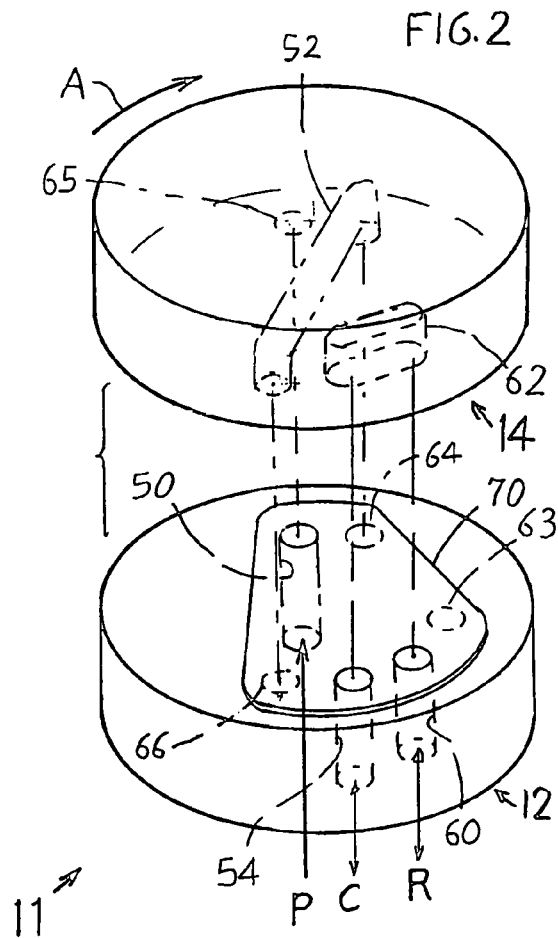
FIG. 2
FIG. 2A

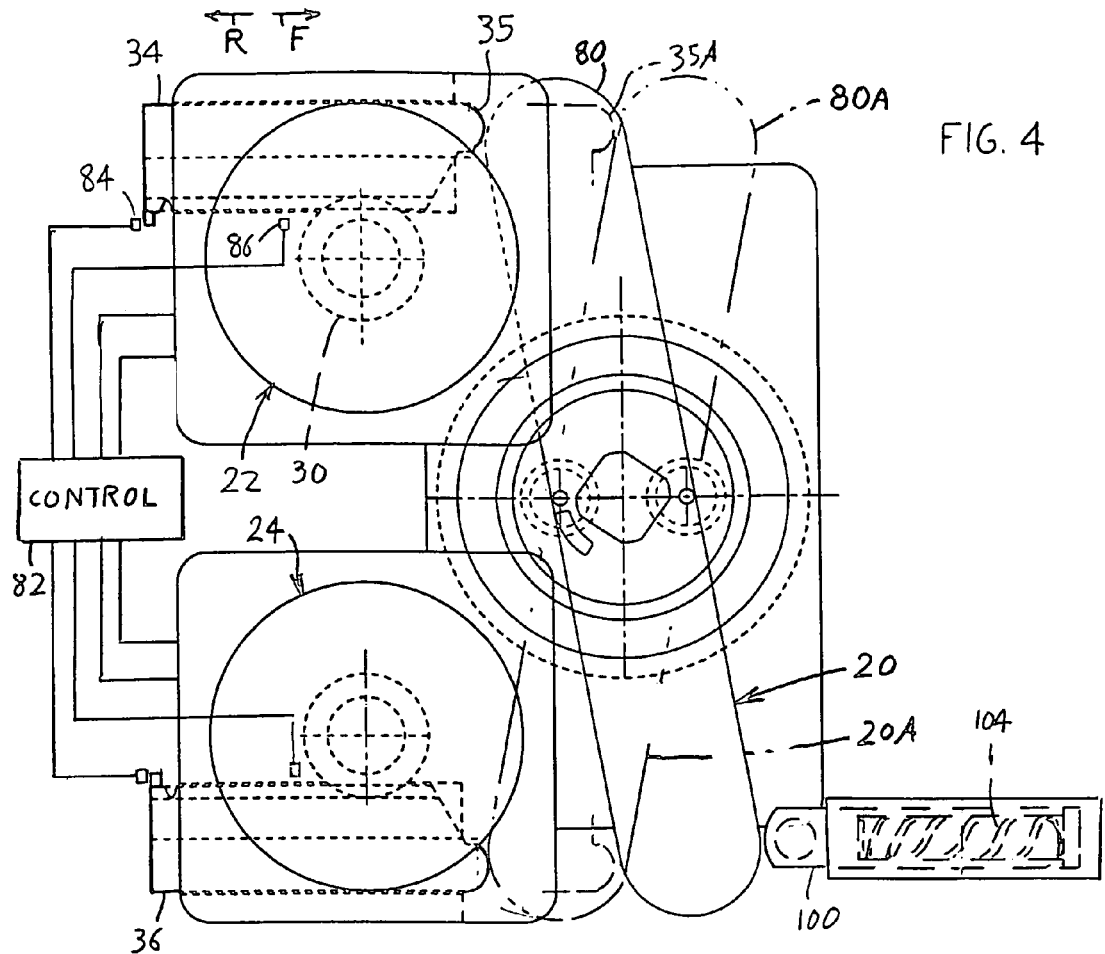
FIG. 4
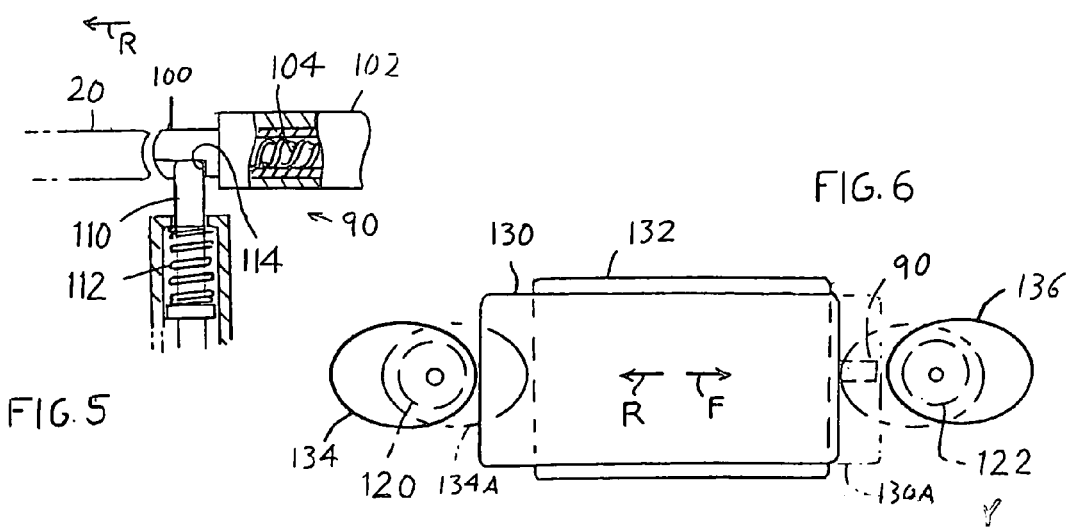
FIG. 5
FIG. 6

US 7,028,705 B1

HIGH TORQUE FAILSAFE VALVE OPERATOR

CROSS-REFERENCE TO RELATED APPLICATION

Applicant claims priority from U.S. Provisional patent application Ser. No. 60/443,467 filed Jan. 28, 2003.

BACKGROUND OF THE INVENTION

This invention is a device for operating a valve that requires a large operating torque and that requires long term reliability, such as a valve that operates at the seafloor in a deep sea.

One type of main valve that requires high torque for operation and high reliability, includes a valve that controls the flow of drilling fluid, such as a water glycol mixture, to drilling equipment that drills into the seabed. A prior main valve of this type includes two metal discs, one pivoting on the other, and with passages that come into and out of alignment. The valve passes fluid from a high pressure source to a cylinder that uses the same or different high pressure fluid as to control the flow of the drilling fluid, or blocks the high pressure fluid while connecting the cylinder to a return. A high torque for a small valve, such as 120 inch pounds is required to pivot one of the discs with respect to the other, while the discs are pressed with high force against one another to avoid leakage at 17,500 psi.

The prior valve assembly includes a pilot valve that controls the flow of fluid at 5,000 psi, and which operates the main valve. The pilot valve is operated by a current of about one ampere at 12 to 24 volts. It was not practical to use a solenoid to operate the main valve, because of the very high current necessary to produce the required actuation force, and the consequent heating.

Experience has shown that the pilot valve is the most unreliable part of the prior valve design. The pilot valve often develops hydraulic fluid leaks of the operating fluid (5,000 psi), and other problems that lead to the need to replace the valve at extreme inconvenience and cost. The main valve has proven to be very reliable but the overall reliability of the complete valve assembly has been limited by the problems with the pilot valve stage. Eliminating the problems with the pilot valve stage would produce a valve with a significantly improved reliability and a much lower operating and maintenance cost. This is especially critical in applications where access to the valve is limited, such as in subsea applications.

SUMMARY OF THE INVENTION

In accordance with one embodiment of the present invention, a valve operator of small size and high reliability for moving a moveable valve element with high force, includes a pair of electric gear motors. A first gear motor has a first driving member that moves the valve element to a connect position, the first driving member then withdrawing from the valve element. The second gear motor moves a second driving member that moves the valve element to a disconnect position, the second driving member then withdrawing from the valve element. In one valve, each driving member is a toothed rack that is moved linearly by a pinion or worm of the corresponding gear motor, and the valve element includes a bar-shaped handle, or force transmitter that receives forces applied by the racks to pivot a valve element disc.

A default mechanism senses when the pressure of a high pressure fluid has fallen to below a predetermined level, to then automatically moves the valve element to a selected position such as the disconnect position. When one of the gear motors moves the valve member from the disconnect position to the connect position, the force applied by the motor also moves the default mechanism back to an initial position.

The novel features of the invention are set forth with particularity in the appended claims. The invention will be best understood from the following description when read in conjunction with the accompanying drawings.

BRIEF DESCRIPTION OF THE DRAWINGS

FIG. 1 is a an exploded isometric view of a portion of a valve of the present invention, shown in an operated, or connect position.

FIG. 1A is a plan view of the valve frame of FIG. 1, and showing, in phantom lines, portion of the moveable valve element in the same position shown in FIG. 1.

FIG. 2 is a view similar to that of FIG. 1, but with the valve element in a disconnect position.

FIG. 2A is similar to FIG. 1A but with the movable valve element in the disconnect position.

FIG. 4 is a plan view of the valve of FIG. 3 with the force transmitter of the valve element shown in solid lines in a connect position and shown in phantom lines in a disconnect position.

FIG. 5 is a partial sectional side view of the default mechanism of the valve of FIG. 4.

FIG. 6 is a plan view of a valve of another embodiment of the invention wherein the gear motors turn cams that slide a valve element.

DESCRIPTION OF THE PREFERRED EMBODIMENTS

Figure 3:
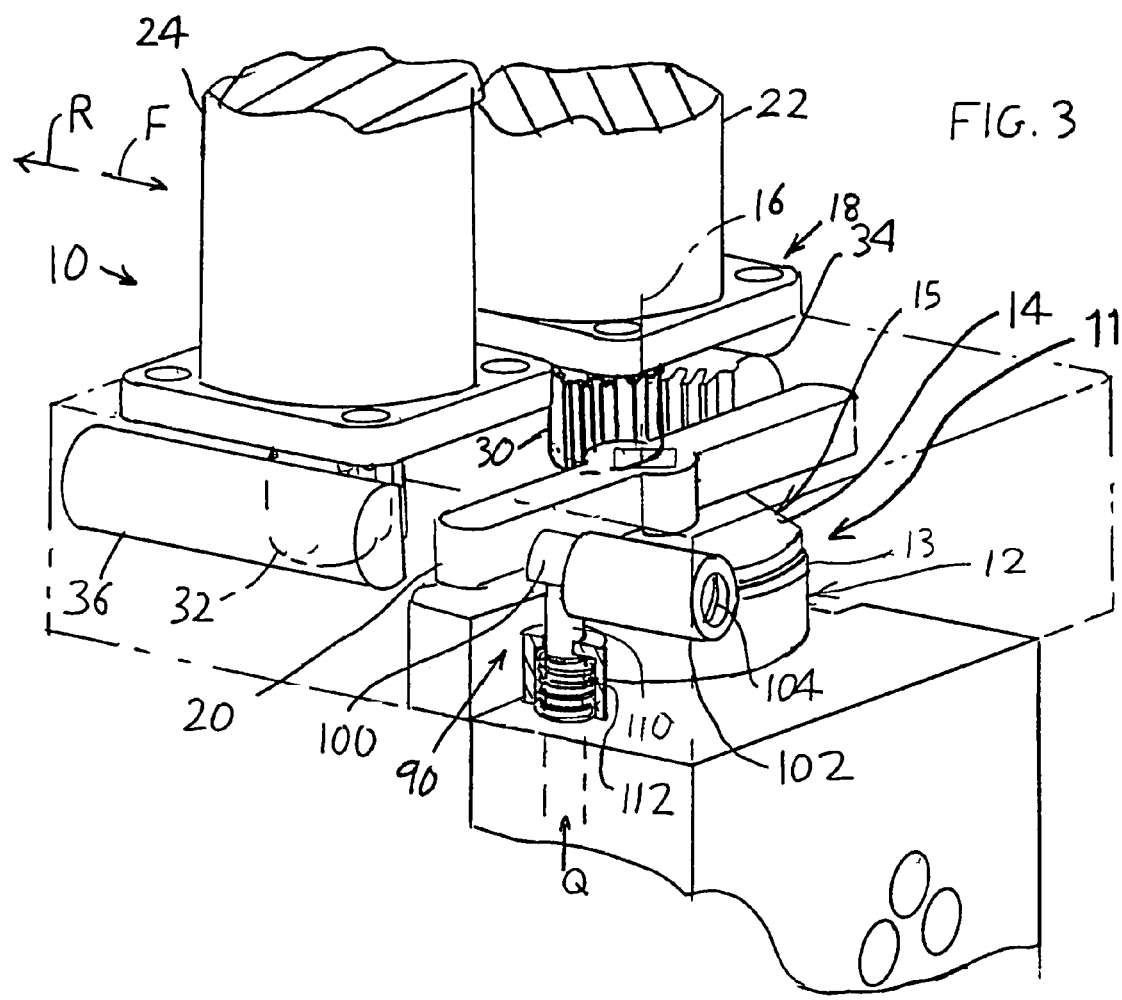
FIG. 3 is a more complete isometric view of the fluid valve of FIGS. 1 and 2.

FIG. 3 illustrates a valve assembly 10 which includes a shear valve 11 of the type that has a stationary disc 12 of a valve frame 13, and that has a pivoting disc 14 of a movable valve element 15 that can pivot about an axis 16. The valve element 15 includes a force transmitter 20 in the form of a bar or handle. The force transmitter 20 can be pivoted to move the pivoting disc 14 between two different valve positions. The force transmitter 20 is pivoted in clockwise (looking down along axis 16) and counterclockwise directions by a valve operator 18 that includes first and second brushless gear motors, or gear motor assemblies 22, 24. The gear motors have intermediate shafts connected to pinions (or worms) 30, 32 that move driving members, or operators in the form of toothed racks 34, 36 in forward and rearward directions F, R. The driving members pivot the handle 20 and pivoting disc 14 between its two positions (bearings for the racks are not shown).

FIG. 1 is a simplified exploded isometric view of the shear valve 11 in an operating, or connect position. The shear valve includes the stationary disc 12 of the valve frame and the pivoting disc 14 of the movable valve element. The discs have surfaces 40, 42 that lie facewise against each other and that are pushed with high force against one another. This type of valve has been proven to provide a secure seal for high pressures, over a long period of time, although considerable torque is required to pivot the disc 14. In an operating (connection) position of the valve illustrated in FIGS. 1 and 1A, a pressure source labeled P is connected through a passage 50 in the stationary disc 12, through a passageway 52 in the pivoting disc, to a passage 54 in the stationary disc. Only the ends 56, 58 of the passageway 52 are exposed. The passage 54 leads to a customer port C to supply high pressure fluid thereto. At the same time, a passage 60 in the stationary disc, which is connected to a return, labeled R, connects to a passageway 62 in the pivoting disc, the passageway 62 not leading anywhere (it ends at location 63). Thus, in the operating position of FIGS. 1 and 1A, which can be referred to as a connect position, the pressure source P is connected through the valve to a customer port C, while the return R is not connected to anything.

FIGS. 2 and 2A illustrate the valve 11 in a default, or disconnect position, after the pivotable disc 14 has pivoted in the clockwise direction by an angle A such as by 20° from the position of FIG. 1. In the default position, which can be referred to as a disconnect position, the pressure source P which is connected to the passage 50, is not connected to anything, but leads to area 65 on the pivoting disc. This is because opposite end of the passageway 52 in the pivoting disc open to areas 64, 66 on the stationary disc which block the passageway 52. However, the customer port C is connected through passage 54 in the stationary disc through passageway 62 in the pivoting disc, and passage 60 in the stationary disc to the return R. Applicant notes that the stationary disc has a land 70 that is highly polished, to avoid leakage when the discs are pressed against one another. The force with which the discs are pressed against one another, depends upon the pressure of the fluid that will pass through the valve.

FIG. 4 shows the force transmitter, or handle 20 in the connect position. To operate the valve to the disconnect position, the first motor 22 is operated to rotate its pinion 30 so it rotates in a clockwise direction to move its rack 34 in the forward direction F. A front end 35 of the rack moves to 35A while it pushes a first end 80 of the handle 20 in a clockwise direction to move the valve 11 to the initial, or disconnect position of FIGS. 2 and 2A. A control 82 that controls operation of the motors, senses that the rack 34 of the first motor has reached its frontmost position at 35A and immediately (preferably less than a minute) reverses the motor 34. The rack then moves rearward R to its initial position, the motor then stopping. Sensors 84, 86 can detect the extreme rack positions. When the valve is to be moved to its operating, or connect position, the second motor 24 is energized to move its rack 36 in the forward direction F sufficient to pivot the handle counterclockwise from 80A back to the position 80 illustrated in solid lines in FIG. 4. The second motor then turns in reverse to return the rack 36 to its initial position.

Small gear motors of high reliability, and with a large reduction gear train, are available at moderate cost. The large force that such gear head motors can apply, using only moderate current to move the rack with a large force because of the large gear reduction, enables pivoting of the valve without the need for a pilot valve and consequent fluid leakage of such pilot valve. The fact that each circuit that drives a gear head motor, moves the rack forward and then rearward assures that the rack is out of the way when the other motor is operated. This also provides the advantage that the valve can be moved to a default (disconnect) position if there is a drop in fluid pressure.

As mentioned above, the valve 11 was designed to pass or block a high pressure fluid, such as at 17,500 psi. One requirement of the valve is that, if the pressure of the fluid being passed through the valve or of another high pressure fluid drops to a low level such as below 2,000 psi, that the valve revert to its default (disconnect) position wherein the high pressure source is blocked from the cylinder C. Applicant provides a failsafe mechanism 90 that moves the valve element handle 20 to the default position indicated at 20A in FIG. 4, when the pressure of a particular fluid applied to the mechanism drops below a predetermined level. The failsafe mechanism 90 shown in FIG. 3, includes a first plunger 100 that slides within a sleeve 102 that carries a compression spring 104. The spring biases the plunger in a rearward direction R to tend to push the valve handle 20 to the default position shown at 20A in FIG. 4. However, a second plunger 110 is biased upwardly by the pressure Q of a fluid that controls the default mechanism. A second spring 112 biases the second plunger 110 downwardly, but normally cannot overcome the upward force Q applied by the pressured fluid.

FIG. 5 shows how the second plunger 110 engages a shoulder 114 on the first plunger 100 to prevent its rearward R movement. When the pressure Q drops below a predetermined value such as 2,000 psi, the second spring 112 pushes down the second plunger 110 to release the first plunger 100. Then, the first plunger 100 pushes the valve handle 20 to the default (disconnect) position 20A. The next time that the second motor 24 (FIG. 4) is energized to move the valve handle to the working (connect) position at 20, the force applied by the second rack 36 pushes the valve handle with sufficient force to overcome the force of first spring 104 and pushes the first plunger 100 to its initial position. The first plunger 100 is automatically held in its first position by the second plunger 110 which is moved upward by the fluid pressure (assuming the fluid pressure is at least 2,000 psi).

Although the figures show a valve with two members in the form of discs having facewise adjacent flat faces, with one of the discs being pivotable, it is possible to have a valve with stationary and moveable valve members, where the moveable valve member slides linearly instead of pivots. In that case, the rack of one of the gear motors can be used to slide the moveable valve member in one direction, and the rack of the other gear head motor can be used to slide the moveable valve member in the opposite direction. FIG. 6 illustrates another arrangement, wherein gear motors 120, 122 slide a slideable valve element 130 in forward F and rearward R directions on a stationary valve frame 132. In this arrangement, each motor turns a corresponding cam 134, 136 by a full turn, and then stops, whenever the valve condition is to be changed between connect and disconnect. Halfway between a full turn each cam such as cam 134 at 134A, has moved the valve element to a selected position 130A and has then "gotten out of the way". The failsafe mechanism 90 (which lies below cam 136) returns the valve element to a selected position when the fluid pressure falls below a preset limit.

Thus, the invention provides a valve of the type that avoids leakage by pressing a moveable valve element tightly against a stationary valve frame, and that has a compact operator for moving the moveable valve member with a high force, which avoids the need for a pilot valve and avoids consequent leakage, and which provides a greater lifetime of valve operation. Applicant uses two gear motors, each operated to move a driving member that, in turn, moves a force transmitter such as a handle of the moveable valve element to a selected valve configuration such as a connect or disconnect position. After a driving member, or driver, has moved the valve element, the gear motor reverses to withdraw the driver from the moveable valve element. Each driver can be a linear moving part such as a gear rack, or a pivotable part such as a rotating cam. A failsafe mechanism includes a spring-biased plunger that is released to move the valve element to the default position when a fluid pressure drops below a predetermined level. The plunger is returned to its standby position the first time that the valve handle is moved to the working position.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A valve operator for moving a moveable valve element, with respect to a stationary valve frame, between connect and disconnect positions of the valve element, wherein in said connect position said valve element connects a source that supplies a high pressure fluid to a device, and in said disconnect position said valve element does not connect said source of high pressure fluid to said device, comprising:

first and second energizable gear motors that have respective first and second driving members for moving said valve element, and a control for operating each of said gear motor to move the corresponding driving member from an initial position to an operating position and then immediately thereafter back to said initial position;

in said operating position of said first driving member said first driving member positions said valve element in said connect position, in said operating position of said second driving member said second driving member positions said valve element in said disconnect position, and in initial positions of said first and second driving members said driving members are each positioned to allow said valve element to be moved between said connect and disconnect positions, whereby said moveable valve element can be moved to a different one of said positions when one of said motors is not energized.

2. The valve operator described in claim 1, including:

a default mechanism that moves said moveable valve element to a selected one of said connect and disconnect positions upon detection of an event, when said moveable valve element is not in said selected position.

3. The valve operator described in claim 2 including:

a handle fixed to said moveable valve element;

said default mechanism includes a main plunger that is moveable against a location on said handle to pivot it to said selected position, and a spring that urges said main plunger against said location on said handle;

said default mechanism also includes a second device that is moveable between a blocking position at which said second device blocks said main plunger from moving against said location on said handle and an unblocking position, a spring that urges said second plunger toward said unblocking position, and a fluid pressure operated device that applies a force to said second device that urges said second plunger toward said blocking position with a force dependent on the pressure of a particular fluid, so when the pressure of said particular fluid decreases below a predetermined level said second spring moves said second device to said unblocking position so said main plunger can move against said location on said handle.

4. The valve operator described in claim 1 wherein said valve element is in the form of a disc that is pivotal about an axis on said valve frame, said valve element and valve frame having surfaces that press against each other, and wherein:

said valve element includes a handle that has opposite ends on opposite sides of said axis;

said driving members are each in the form of a slideable rack, each rack being moved from its initial position in a first direction against one of said handle ends to move the corresponding handle end generally in said first direction to pivot the valve element disc to a different one of said positions, and each rack immediately thereafter being moved back to its initial position, whereby said handle is substantially always free to be pivoted.

5. A valve operator for moving a moveable valve element with respect to a stationary valve frame, to move the valve element between connect and disconnect positions of the valve element, wherein in said connect position said valve element connects a source of high pressure fluid to a device that is operated by said high pressure fluid, and in said disconnect position said valve element does not connect said source of high pressure fluid to said device, comprising:

first and second energizable motor assemblies that have respective first and second driving members for moving said valve element, and a control for operating each of said motor assemblies to move the corresponding driving member from an initial position to an operating position and then thereafter automatically back to said initial position;

said valve element and driving members are arranged so when said first driving member moves to its operating position said first driving member positions said valve element in said connect position, but when said first driving member moves back to its initial position said first driving member does not change the position of said valve element and is out of the way of movement of said valve member back to its disconnect position, and so when said second driving member moves to its operating position said second driving member positions said valve element in said disconnect position, but when said second driving member moves back to its initial position said second driving member does not change the position of said valve element and lies out of the way of movement of said valve member back to its connect position.

6. The valve operator described in claim 5 including:

means responsive to a drop in pressure of a particular fluid to a predetermined pressure, for automatically moving said valve element to said disconnect position.

7. The valve operator described in claim 5 including:

a default mechanism for automatically moving said valve element to said disconnect position when the pressure of a particular high pressure fluid falls below a predetermined low level, including a first default operating element, a spring that urges said first default operating element to move from a stowed position and against said valve element to move said valve element to said disconnect position, and a pressure-operated latch that blocks movement of said first default operating element until the pressure of said particular fluid falls below said predetermined low level.

8. The valve operator described in claim 7 wherein:

said spring applies a first force to said first default element, while said first motor assembly moves said first driving member with sufficient force to move said first default element back toward its stowed position while moving said valve element to its connect position.

9. The valve operator described in claim 5 wherein:

said valve element is pivotally mounted on said valve frame about an axis and said valve element includes a handle with opposite ends that lie on opposite sides of said axis;

said motor assemblies each includes an electric motor, a gear train, and a linearly movable driving member that is positioned to move in a first direction from an initial position and against a different end of said handle to move the handle and the rest of said valve element to change the position of the valve element to a different one of said valve element positions, and to move in a second direction back to said initial position;

a control that energizes each motor assembly to move its driving member from its initial position to its operated position and immediately thereafter back to its initial position.

10. The valve operator described in claim 5 wherein:

said valve element is linearly slideable mounted on said valve frame to move forward to said connect position and to move rearward to said disconnect position;

said motor assemblies each includes an electric motor, a gear train, and a movable driving member that is positioned to move from an initial position and against said valve element and to continue to an operated position wherein said valve element has been moved to a different one of said valve element positions;

a control that energizes each motor assembly to move its driving member from its initial position to its operated position and immediately thereafter back to its initial position.

* * * * *